(12) United States Patent
Aly

(10) Patent No.: US 8,625,575 B1
(45) Date of Patent: Jan. 7, 2014

(54) TRAFFIC-OBLIVIOUS LOAD BALANCING PROTOCOL FOR SENSOR NETWORKS

(75) Inventor: Mohamed Aly, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/314,645

(22) Filed: Dec. 8, 2011

Related U.S. Application Data

(63) Continuation of application No. 11/875,531, filed on Oct. 19, 2007, now Pat. No. 8,085,792.

(60) Provisional application No. 60/947,370, filed on Jun. 29, 2007, provisional application No. 60/947,376, filed on Jun. 29, 2007.

(51) Int. Cl.
*H04L 12/28* (2006.01)
*H04L 12/56* (2011.01)

(52) U.S. Cl.
CPC .................. *H04L 45/00* (2013.01); *H04L 45/04* (2013.01)
USPC ........... 370/351; 370/229; 370/230; 370/235; 370/236; 370/237; 370/238; 370/254; 370/255; 370/256; 370/310; 370/395.2; 370/395.21; 370/389; 370/400; 709/238; 709/239; 709/240; 709/241

(58) Field of Classification Search
None
See application file for complete search history.

(56) References Cited

U.S. PATENT DOCUMENTS

| | | | |
|---|---|---|---|
| 6,304,556 B1 * | 10/2001 | Haas | 370/254 |
| 6,457,047 B1 | 9/2002 | Chandra et al. | |
| 6,768,994 B1 | 7/2004 | Howard et al. | |
| 6,980,985 B1 | 12/2005 | Amer-Yahia et al. | |
| 7,184,945 B1 * | 2/2007 | Takahashi et al. | 703/22 |
| 7,389,295 B2 | 6/2008 | Jung et al. | |
| 7,506,011 B2 | 3/2009 | Liu et al. | |
| 7,710,884 B2 | 5/2010 | Liu et al. | |
| 2001/0021175 A1 * | 9/2001 | Haverinen | 370/230 |
| 2001/0033556 A1 | 10/2001 | Krishnamurthy et al. | |
| 2002/0143755 A1 | 10/2002 | Wynblatt et al. | |
| 2003/0039250 A1 * | 2/2003 | Nichols et al. | 370/394 |
| 2004/0010492 A1 | 1/2004 | Zhao et al. | |
| 2005/0078672 A1 * | 4/2005 | Caliskan et al. | 370/389 |
| 2005/0135360 A1 * | 6/2005 | Shin et al. | 370/389 |
| 2005/0157698 A1 * | 7/2005 | Park et al. | 370/351 |
| 2005/0204018 A1 | 9/2005 | Jensen | |
| 2006/0002368 A1 * | 1/2006 | Budampati et al. | 370/351 |
| 2006/0046664 A1 | 3/2006 | Paradiso et al. | |
| 2006/0062154 A1 | 3/2006 | Choy et al. | |
| 2006/0077918 A1 * | 4/2006 | Mao et al. | 370/310 |
| 2006/0092913 A1 * | 5/2006 | Joseph et al. | 370/351 |
| 2006/0153154 A1 | 7/2006 | Yoon et al. | |
| 2006/0161645 A1 | 7/2006 | Moriwaki et al. | |

(Continued)

OTHER PUBLICATIONS

Aly, M., et al., "Decomposing Data-Centric Storage Query Hot-Spots in Sensor Networks," Proceedings of Mobiquitous, 2006, 9 pages.

(Continued)

*Primary Examiner* — Ayaz Sheikh
*Assistant Examiner* — Peter Chau
(74) *Attorney, Agent, or Firm* — Fish & Richardson P.C.

(57) ABSTRACT

A sensor in a network to which to route a packet is selected, where the sensor is selected independently of energy status of the sensors included in the network, and the sensor is selected by a source sensor. The packet is routed from the source sensor toward the destination sensor.

18 Claims, 13 Drawing Sheets

(56) References Cited

U.S. PATENT DOCUMENTS

| | | | |
|---|---|---|---|
| 2006/0200696 A1* | 9/2006 | Shimada | 714/5 |
| 2006/0259597 A1* | 11/2006 | Jiang et al. | 709/222 |
| 2006/0280129 A1* | 12/2006 | Kline et al. | 370/254 |
| 2007/0019604 A1 | 1/2007 | Hur et al. | |
| 2007/0043803 A1 | 2/2007 | Whitehouse et al. | |
| 2007/0189268 A1* | 8/2007 | Mitra et al. | 370/352 |
| 2007/0214046 A1 | 9/2007 | Falchuk et al. | |
| 2008/0056291 A1 | 3/2008 | Liu et al. | |
| 2009/0055691 A1 | 2/2009 | Ouksel et al. | |

OTHER PUBLICATIONS

Aly, M., et al., "KDDCS: A Load-Balanced In-Network Data-Centric Storage Scheme for Sensor Networks," Proceedings of CIKM, Nov. 5-11, 2006, Arlington, Virginia, 10 pages.

Aly, M., et al., "Online Packet Admission and Oblivious Routing in Sensor Networks," Proceedings of ISAAC, 2006, 10 pages.

Aly, M., et al., "Zone Sharing: A Hot-Spots Decomposition Scheme for Data-Centric Storage in Sensor Networks," Proceedings of DMSN, Aug. 29, 2005, Trondheim, Norway, 6 pages.

Baek, S.J., et al., "A Scalable Model for Energy Load Balancing in Large-scale Sensor Networks," Proceedings of the International Symposium on Modeling and Optimization in Mobile, Ad Hoc and Wireless Networks, Jun. 2006, 10 pages.

Busch, C., et al., "Oblivious Routing on Geometric Networks," Jul. 18-20, 2005, Proceedings of SPAA, Las Vegas, Nevada, 9 pages.

Dulman, S., et al., "Trade-Off between Traffic Overhead and Reliability in Multipath Routing for Wireless Sensor Networks," Proceedings of IEEE Wireless Communications and Networking Conference (WCNc), Jan. 2003, 5 pages.

Fonseca, R., et al., "Beacon Vector Routing: Scalable Point-to-Point Routing in Wireless Sensornets," NSDI '05: $2^{nd}$ Symposium on Networked Systems Design & Implementation, 2005, pp. 329-334.

Ganesan, D., et al., "Highly-Resilient, Energy-Efficient Multipath Routing in Wireless Sensor Networks," 2001, ACM SIGMOBILE Mobile Computing and Communications Review, Long Beach, California, pp. 251-254.

Hajiaghayi, M., et al., "New Lower Bounds for Oblivious Routing in Undirected Graphs," Proceedings of SODA, Miami, Florida, Jan. 22-26, 2006, pp. 918-927.

Hajiaghayi, M., et al., "Oblivious Routing in Directed Graphs with Random Demands," Proceedings of STOC, Baltimore, Maryland, May 2005, pp. 193-201.

Harrelson, C., et al., "A Polynomial-time Tree Decomposition to Minimize Congestion," Proceedings of SPAA, San Diego, California, Jun. 7-9, 2003, pp. 34-43.

Intanagonwiwat, C., et al., "Directed Diffusion for Wireless Sensor Networking," IEEE/ACM Transactions on Networking (TON), 2003, pp. 2-16.

Karp, B., et al., "GPSR: Greedy Perimeter Stateless Routing for Wireless Networks," Proceedings of ACM Mobicom, 2000, Boston, Massachusetts, pp. 243-254.

Kim, Y.J., et al., "On the Pitfalls of Geographic Face Routing," Proceedings of DIALM-POMC, Sep. 2, 2005, Cologne, Germany, pp. 34-43.

Kim, S., et al., "Safe: A Data Dissemination Protocol for Periodic Updates in Sensor Networks," In Workshop on Data Distribution for Real-Time Systems (DDRTS), May 2003.

Newsome, J., et al., "GEM: Graph Embedding for Routing and Data-Centric Storage in Sensor Networks without Geographic Information," Proceedings of SenSys, Nov. 5-7, 2003, Los Angeles, California, pp. 76-88.

Racke, H., et al., "Minimizing Congestion in General Networks," Proceedings of the $43^{rd}$ Annual Symposium on Foundations of Computer Science (FOCS'02), 2002, 10 pages.

Raicu, I., et al., "Local Load Balancing for Globally Efficient Routing in Wireless Sensor Networks," International Journal of Distributed Sensor Networks, 2005, 35 pages.

Rao, A., et al., "Geographic Routing without Location Information," Proceedings of Mobicom, 2003, San Diego, California, pp. 96-108.

Shah, R., et al., "Energy Aware Routing for Low Energy Ad Hoc Sensor Networks," Proceedings of IEEE Wireless Communications and Networking Conference (WCNc), 2002, 6 pages.

Yin, C., "Supporting Cooperative Caching in Ad Hoc Networks," In: Proceedings of the $23^{rd}$ Conference of the IEEE Communications Society (Infocom 2004), Hong Kong, Mar. 2004.

Prabh, et al, "Energy-Conserving Data Cache Placement in Sensor Networks," 2005, ACM Trans Sensor Networks, 1(2):178-203.

Xuan, et al., "A Coordination-based Data Dissemination Protocol for Wireless Sensor Networks," Proceedings of the 2004 Intelligent Sensors, Sensor Networks and Information Processing Conference, ISSNIP 2004, Melbourne Australia, Dec. 14-17, 2004, pp. 13-18.

Ye, et al., "A Two-tier Data Dissemination Model for Large-scale Wireless Sensor Networks," Proceedings of the 8th Annual International Conference on Mobile Computing and Networking, Sep. 23-28, 2002, Atlanta, Georgia, USA, pp. 148-159.

* cited by examiner

TRAFFIC-OBLIVIOUS LOAD BALANCING PROTOCOL FOR SENSOR NETWORKS

CROSS-REFERENCE TO RELATED APPLICATIONS

This application is a continuation application of U.S. patent application Ser. No. 11/875,531 filed Oct. 19, 2007, and titled TRAFFIC-OBLIVIOUS LOAD BALANCING PROTOCOL FOR SENSOR NETWORKS, which claims the benefit of U.S. Provisional Application No. 60/947,370, filed Jun. 29, 2007, and titled A TRAFFIC-OBLIVIOUS LOAD-BALANCING PROTOCOL FOR SENSOR NETWORKS, and U.S. Provisional Application No. 60/947,376, filed Jun. 29, 2007, and titled TRAFFIC-OBLIVIOUS LOAD BALANCING PROTOCOL FOR SENSOR NETWORKS—all of which are incorporated by reference in their entireties.

TECHNICAL FIELD

This description relates to load balancing in a network.

BACKGROUND

Conventional sensors can be configured to communicate through networks to computers. Some forms of networked sensor can transmit status information and operating data over the network, as well as receive and respond to messages, such as commands or queries, received over the network.

SUMMARY

In one general aspect, a sensor in a network to which to route a packet is selected. Where the sensor is selected independently of energy status of the sensors included in the network, and the sensor is selected by a source sensor. The packet is routed from the source sensor toward the selected sensor.

The source sensor may select the sensor at random or pseudo-randomly from among the sensors included in the sensor network. Selecting the sensor independently of the energy status of the sensors included in the network may include selecting the sensor without consideration of the energy status of the sensors included in the network. Selecting the sensor independently of the energy status of the sensors included in the network may include selecting the sensor without determining whether the sensor has been previously selected. Routing the packet may include routing the packet using an underlying routing protocol of the sensor network. The underlying routing protocol of the sensor network may be a point-to-point routing protocol. Routing the packet from the source sensor toward the selected sensor may include routing the packet toward the selected sensor without enumeration of a path from the source sensor to the selected sensor. The packet may be routed from the selected sensor toward the destination sensor. A value of an indicator configured to indicate whether to route the packet to the selected sensor or to the destination sensor may be determined, and whether to route the packet to the destination sensor may be determined based on a distance to the destination sensor. The value of the indicator may be changed to indicate that the packet is to be routed to the destination sensor based on the determination of whether to route the packet to the destination sensor. The packet may be routed to the destination sensor.

In another general aspect, a packet is routed along a path through a sensor network from a source sensor to the destination sensor. The path is independent of alternative paths through the network from the source to the destination sensor, the path is independent of an energy status of the sensors included in the network, and the path is determined by the source sensor.

The path may be progressively developed while routing the packet from the source sensor such that the path is not enumerated before routing the packet along the path. The path may be a first path and a second packet may be routed along a second path through the sensor network from the source sensor to the destination sensor. The second path may be independent from the path through the sensor network. The path through the sensor network may include one or more intermediate sensors. The source sensor may select one of the intermediate sensors and the packet may be routed from the source sensor to the selected intermediate sensor before routing the packet to the destination sensor. The source sensor may select one of the intermediate sensors at random from among the sensors included in the sensor network.

In another general aspect, a sensing device includes at least one processor and a storage device. The storage device stores instructions for causing the at least one processing device to select two or more sensors in a network to which to route a packet. The sensors are selected independently of energy status of the sensors included in the network, the sensors are selected by the source sensor, and the network includes sensors and a geographic area in which no sensors are deployed. Whether a number of packets routed in a direction toward one of the selected sensors does not exceed the number of packets routed in a direction of the other selected sensors is determined. The packet is routed from the source sensor toward the one of the selected sensors, the routing being conditioned upon a determination that a number of packets routed in the direction toward the one of the selected sensors does not exceed the number of packets routed in the direction of the others of the selected sensors. The source sensor may select the sensors at random from among the sensors in the sensor network. The number of packets routed in the direction of the selected sensors may be equal and the at least one processing device may determine to which of the selected sensors a packet was least recently routed toward, and select the sensor least recently routed toward as the one of the selected sensors.

The geographic area in which no sensors are deployed may include a region that includes a physical obstruction. Determining whether a number of packets routed in the direction toward one of the selected sensors may include determining a number of packets routed in the direction toward a neighbor of the source sensor. Routing the packet may include routing the packet using an underlying routing protocol of the sensor network. The underlying routing protocol of the sensor network may be a point-to-point routing protocol.

In another general aspect, a packet is identified for routing through a network from a source sensor to a destination associated with the network. A plurality of sensors in the network is randomly selected at the source sensor. A load associated with each of the plurality of sensors is determined. The packet is routed to the sensor having the lightest load rather than directly to the destination, where the sensor having the lightest load is the sensor to which the fewest packets have been routed.

In another general aspect, a sensor in a network to which to route a packet from a source sensor in a path toward a destination is selected. The sensor is selected independently of energy status of the sensors included in the network, the sensor is selected by the source sensor, and the sensors in the network have a non-uniform spatial distribution. Whether a number of packets routed in the direction toward the selected sensor does not exceed the number of packets routed in the direction of neighbor sensors of the source sensor is determined. The packet is routed from the source sensor toward the selected sensor. The routing is conditioned upon a determination that a number of packets routed in the direction toward the selected sensor does not exceed the number of packets routed in the direction of the neighbors.

The source may select the sensor at random from among the sensors included in the sensor network. The routing may be conditioned upon a determination that the number of packets routed in the direction toward the selected sensor does not exceed a number of packets routed in the direction toward the neighbors comprises routing the packet conditioned upon a determination that the number of packets routed in the direction toward the selected sensor is less than the number of packets routed in the direction of each of the neighbors. The routing may be conditioned upon a determination that the number of packets routed in the direction toward the selected sensor does not exceed the number of packets routed in the direction of the neighbors, and a second sensor in the network to which to route the packet may be selected before the packet is routed to the destination sensor.

The packet may be routed from the source sensor toward the selected second sensor without enumeration of a path from the source sensor to the selected second sensor, and the routing may be conditioned upon a determination that the number of packets routed in the direction toward the selected second sensor is less than the number of packets routed toward each neighbor of the second sensor. A count may be maintained on the source sensor in response to a packet being routed from the source sensor to the selected sensor. The number of packets routed to the selected sensor may be determined based on the counter and without communication between the source sensor and the selected sensor. Determining that the number of packets routed in the direction toward the selected sensor does not exceed the number of packets routed in the direction toward the neighbors may be determined based on a comparison, to a threshold, of a ratio of a counter representing a direction of the selected sensor and the sum of counters representing directions of the neighbor sensors. The packet may be forwarded in a direction other than the direction toward the selected sensor when the threshold value is exceeded. The neighbor sensors of the source sensor may be sensors within the communication range of the source sensor.

Implementations of the described techniques may include a method or process or computer software on a computer-readable medium.

The details of one or more implementations are set forth in the accompanying drawings and the description below. Other features will be apparent from the description and drawings, and from the claims.

DETAILED DESCRIPTION

Figure 1A:
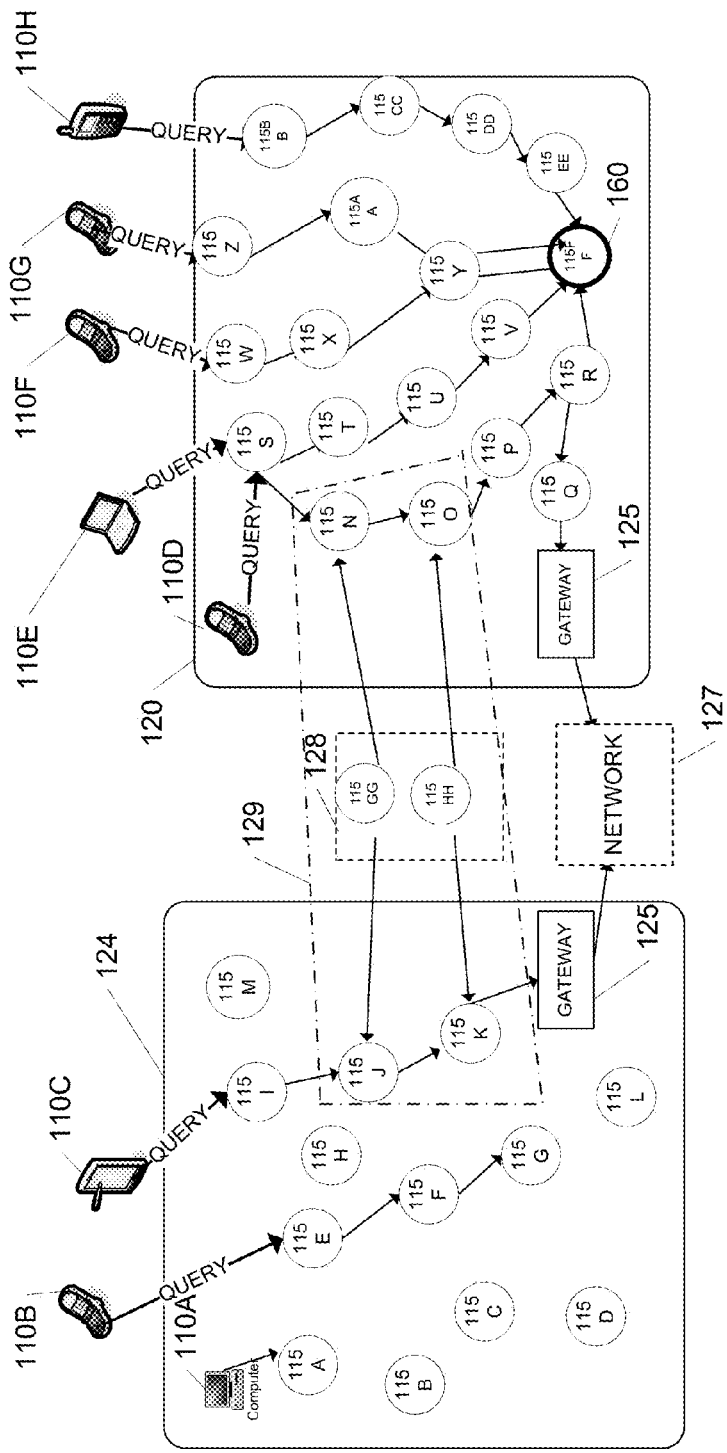
FIG. 1A is a block diagram depicting an example communications system.

FIG. 1A illustrates an example communications system 100 in which sensor query devices 110A-110G query sensors 115A-115FF for information stored on the sensors 115A-115FF. In some implementations, the sensors 115A-115HH are clustered into geographically localized sensor networks, illustrated as sensor networks 120, 124, 128 and 129. The sensor networks 120, 124, 128 and 129 also may be referred to as clusters or sensor clusters.

A sensor query device may be (or included in) mobile devices such as, for example, cellular telephones, personal data assistants (PDAs), robots, media players, and laptops. As illustrated, sensor query devices 110B-110H are mobile devices. A sensor query device also may be or included in stationary devices such as, for example, servers, workstations, set-top boxes, game consoles, and desktop computers. As illustrated, sensor query device 110A is a stationary device. Because the sensor query devices 110B-110H are mobile devices that can move in and out of the networks 120 and 124, and move around within the networks 120 and 124, the amount and distribution of traffic (which arises from queries made by the sensor query devices 110A-110H) in the sensor networks 120 and 124 may be unpredictable because the number and location of sensor query devices 110A-110H can be variable. Moreover, queries may be made by sensor query devices that are within the boundaries of the networks 120 and 124, such as the sensor query device 110D, or by sensor query devices located outside of the boundaries of the sensor networks 120 and 124, such as the sensor query devices 110E-110H. The sensor query devices 110B-110H may move around within the networks 120 and 124 and they may move between the networks 120 and 124. For example, as shown, the sensor query device 110D is located within the network 120. However, the sensor query device 110D may move around within the network 120, outside of the network 120, or inside of the network 124.

Additionally, the amount and distribution of traffic across the networks 120 and 124 may vary temporally because certain types of queries are more popular during a particular time of day (e.g., queries for available parking spots near a popular restaurant during dinner time) or during a particular event (e.g., queries for available parking spots at a stadium shortly before a professional sports game). Thus, the traffic across the sensor networks 120 and 124 may be unevenly distributed, which may lead to reduced lifetime and reduced operability of the sensors that process a higher volume of packets.

A traffic-oblivious load-balancing protocol may make the distribution of traffic across the sensor networks 120 and 124 more uniform. The traffic-oblivious load-balancing protocol routes packets from a source sensor to a destination sensor based on, for example, decisions made by the source sensor. Additionally, the traffic-oblivious load-balancing protocol routes a packet through the sensor networks 120 and 124 even though the packet's path through the sensor networks 120 and 124 is not predetermined, enumerated or otherwise predefined before the routing is initiated. Avoiding the use of a predetermined path through which to route packets through the sensor network may reduce the storage load on the sensors because the sensors do not have to store the predetermined paths.

The traffic-oblivious routing protocol does not depend on the underlying routing protocol used by the sensor networks 120 and 124. The traffic-oblivious routing protocol uses source sensors or sensor-querying devices to select intermediate sensors or locations within the network to which to route packets, but the underlying routing protocol of the sensor networks 120 and 124 is used to pass the packet through the sensor networks 120 and 124. Thus, the traffic-oblivious routing protocol may be used on top of (or otherwise in combination, association or conjunction with) any underlying sensor network protocol.

Additionally, in some implementations, the traffic-oblivious load-balancing protocol routes packets independently of the energy state of the sensors in the networks 120 and 124 to achieve traffic-oblivious load balancing. In some implementations, the protocol randomly, or pseudo-randomly (and referred to hereafter as just randomly) selects a location or a sensor to which to route a packet prior to routing the packet. Thus, the protocol is independent of the energy state of the sensors in the network, and the protocol is performed without communication between the sensors prior to routing the packet.

As described in greater detail below, randomly selecting an intermediate destination sensor in the network, or a random location near a sensor in the network, to which to route a packet before the packet is routed to its destination sensor may result in a more even distribution of traffic across the sensor networks 120 and 124. In particular, random selection of an intermediate destination sensor results in packets being routed through different paths through the sensor network to reach the same destination sensor. Traffic across the sensor networks 120 and 124 may be considered to be evenly distributed, or balanced, if the energy consumption of the sensors 115A-115HH is approximately equal. By routing packets through different paths through the sensor network, the energy consumption of the sensors 115A-115HH is more evenly distributed across each of the sensors 115A-115HH.

Figure 1B:
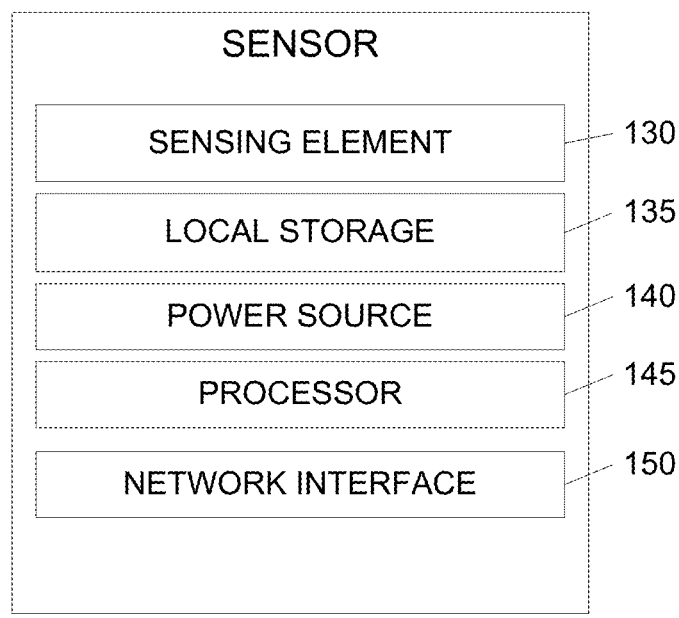
FIG. 1B is a diagram illustrating an example sensor.

Referring to FIG. 1B, the sensor 115 generally includes a sensing element 130, local storage 135, a power source 140, a processor 145, and a network interface 150. The configuration of sensor 115 is shown as an example, other sensors in the sensor network 100 may include similar or different components/configurations. The sensing element 130 collects data that is stored in the local storage 135 such that the sensor 115 may provide the data in response to a query. The sensing element 130 may include more than one type of sensing device. For example, the sensing element 130 may be a sensor such as a temperature sensor, a pressure sensor, a motion sensor, a moisture sensor, an infrared sensor, a biosensor, and/or a device capable of collecting image, video, or other data (e.g., a camera). Thus, the sensing element 130 may monitor data related to the physical environment in the vicinity of the sensor 115. In addition to, or instead of, storing data collected by the sensing element 130, the local storage 135 may store data received from another sensor in the sensor network, another sensor outside the sensor network or a sensor query device 110.

The local storage 135 may be a semiconductor memory device, such as an Erasable Programmable Read-Only Memory (EPROM), an Electrically Erasable Programmable Read-Only Memory (EEPROM), a flash memory device, or another type of component that stores data collected by the sensing element 130. In some implementations, the local storage 135 is configured to overwrite stored data with recently received data. Thus, the sensor 115 may provide real-time, or near real-time, information in response to queries while also allowing the local storage 130 to be of relatively small capacity. In some implementations, the local storage 135 may store two queries and two responses in addition to the data collected by the sensing element 130. In one example, the local storage 135 may have a capacity of about one megabyte or less.

The local storage 135 also may store data related to the status of the sensor 115. For example, the local storage 135 may store data associated with the activity of the sensor 115, such as, for example, power remaining in the power source 140, the number of queries received by the sensor 115, the number of queries and packets forwarded by the sensor 115, the number of responses provided by the sensor 115, and information associated with the sources of the queries made to the sensor 115 (such as identifiers of the sources of the queries). Additionally, the local storage 135 may store instructions for processing and responding to queries received by the sensor 115. In some implementations, the sensor 115 also may include a status indicator component that is separate from the local storage 135. The status indicator may store, for example, power remaining in the power source 140 in lieu of such information being stored in the local storage 135.

The power source 140 may be a portable power source that is included within the sensor 115, such as a battery. In other implementations, the power source 140 may be external to the sensor 115. The sensor 115 also includes a network interface 150 through which the sensor 115 communicates with the other sensors in the sensor network, the sensor query devices 110, and a gateway 125. The network interface 150 may be a wireline or wireless interface configured to provide a data connection between the sensor 115 and the other sensors in the sensor network, the sensor query devices 110, and the gateway 125. For example, the network interface 150 may be, for example, an Ethernet port, a Wi-Fi interface (e.g., an IEEE 802.11 interface), a Bluetooth interface (e.g., an IEEE 802.15.1) interface, or a generic radio transceiver interface.

Referring back to FIG. 1A, one or more of the sensors 115A-115HH of FIG. 1A may be of the form of sensor 115 of FIG. 1B. Additionally or alternatively, one or more of the sensors 115A-115HH may include more than one sensor, or a sensor may include more than one type of sensing elements. For example, a sensor may include multiple video cameras and multiple motion detectors.

The sensors included in the sensor networks 120 and 124 may communicate with a network 127 that is separate from the sensor networks 120 and 124 through the gateway 125. The network 127 may be, for example, the Internet. In some implementations, the gateway 125 may include a sensor similar to the sensors 115A-115FF. Thus, the sensors 115A-115M included in the network 124 may communicate with the sensors 115N-115FF included in the network 120 through a sensor similar to the sensor 115 of FIG. 1B. In some implementations, the sensors in the network 120 may communicate with the sensors in the network 124 through an intermediate network 128. As shown, the intermediate network 128 includes sensors 115GG and 115HH. However, the intermediate network 128 may include more or fewer sensors. As shown, the sensors 115J and 115K communicate with the sensors 115N and 115O through the sensors 115GG and 115HH, respectively. Additionally, the sensors 115J, 115K, 115N, 115O, 115GG, and 115HH may be considered an additional network 129.

The sensors 115A-115HH generally receive queries from the sensor query devices 110A-110G requesting data from the sensors 115A-115HH. Because the sensor query device 110 may be a mobile device that moves in and out of the boundaries of the sensor network and moves around within the sensor network, the amount and distribution of traffic in the sensor network resulting from queries from the sensor query device 110 may be unpredictable.

In particular, a query hotspot may occur when most of the queries made within the sensor network request data stored on one or a small number of the sensors 115A-115FF. For example, a query hotspot 160 is illustrated in the sensor network 120. In this example, the sensor query devices 110D-

110G query the sensor 115FF simultaneously to cause a query hotspot 160. The query hotspot 160 may occur because of the popularity of a particular sensor at a certain time of day, day of the week, because of the location of the sensor, or because of the type of data that the sensor provides. For example, the query hotspot 160 may be caused by many queries requesting temperature readings stored on a relatively small number of sensors 115. In another example, the query hotspot 160 may be a result of many queries simultaneously requesting geographic location-specific information from a sensor located in an area of interest to many users of mobile devices, such as a sensor with data related to available parking spots during the lunch hour on a weekday.

The presence of the query hotspot 160 increases the possibility of a skewed distribution of traffic across the sensor network 120 because of the concentration of queries in a relatively localized area of the sensor network 120. As a result of the query hotspot 160, network traffic may be concentrated in the relatively localized area of the sensor network 120, which may cause the power sources of the sensors in and around the hot spot 160 to be depleted more quickly as compared to other sensors in the sensor network 124.

To more evenly distribute the traffic across the sensor network 120, the sensor that receives the query from the mobile device (which may be referred to as the "source sensor"), or the sensor query device that issued the query, randomly selects a sensor in the sensor network 120, or a location in the sensor network 120, to which to route a packet that includes information associated with the query. By randomly selecting a sensor in the sensor network 120, the packets follow different paths through the sensor network 120 even though the packets result from queries requesting data from the same sensor (sensor 115FF in this example).

For example, the sensor query device 110D makes a query for data stored on the sensor 115FF. The sensor 115S receives the query and randomly selects a sensor to which to route the corresponding packet. In this example, the sensor 115S randomly selects the sensor 115R. The sensor 115S routes the packet toward the sensor 115S before routing it to the destination sensor (e.g., the sensor 115FF). The packet may be greedily routed through the network. In other words, the packet is routed through the network using an underlying point-to-point routing protocol of the sensor network. For example, to greedily route the packet, the sensor 115N receives the packet and passes it to a local sensor, such as the sensor 115O, which is near the sensor 115N rather than broadcasting the packet to a sensor that is more remote from the sensor 115N. The packet continues to be greedily routed to a local sensor as it follows a path through the sensor network 120 from the sensor 115N as it is routed toward the randomly selected sensor 115R. The packet is routed to the sensor 115FF (e.g., the destination sensor) after it has been routed toward the sensor 115R. In this example, the packet corresponding to the query from the sensor query device 110D follows a path from the sensor 115S to the sensor 115FF through the sensor network 120 such that the path is not predetermined, enumerated or otherwise predefined before the routing is initiated.

The queries from the sensor query devices 110E-110H are also routed through the sensor network 120 by randomly selecting a sensor in the sensor network 120 to which to route the packet. As a result, each of the queries from the sensor query devices 110E-110H will generally follow a different path through the sensor network 120 even though each of the queries requests data from the same sensor (sensor 115FF in this example). For example, the packet corresponding to the query from the sensor query device 110F travels through the sensor 115W to the sensor 115FF. Because the packets travel through different paths as a result of randomly selecting the sensor to which to route the packet, the traffic across the network is generally evenly distributed even when most, or all, queries in the network request data from the same sensor.

In some implementations, the sensors 115A-115HH generally know their location and the boundaries of the network. In some implementations, the sensors 115A-115HH may be addressed relative to each other or they may be addressed by absolute coordinates, such as the latitude and longitude location of each of the sensors 115A-115HH. Thus, the sensors 115A-115HH can, in some implementations, route packets to other sensors within the network using either the relative or absolute coordinates of the other sensors.

Figure 2:
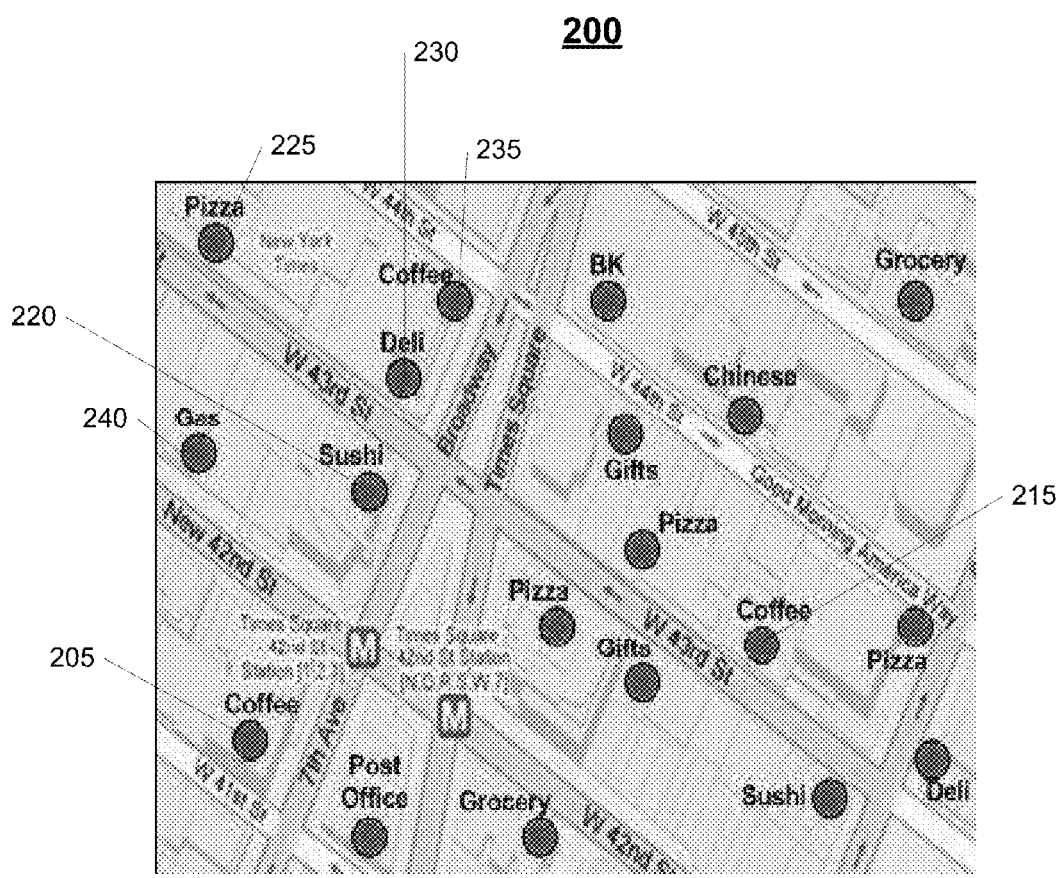
FIGS. 2, 7, 10 and 11 are block diagrams of sensor network examples.

Referring to FIG. 2, an example sensor network 200 includes multiple sensors distributed in a metropolitan area. As shown, the sensor network 200 is distributed over a geographical region including several city blocks. However, in other implementations, the sensor network may be distributed over a larger or smaller geographical area, or distributed within a different type of geographical area (such as, for example, a sensor network in a wilderness area designed to collect and distribute data related to wildlife).

The sensors in the example network 200 measure data and provide information of interest to mobile device users in the area of the sensors or to Internet users that have access to the network 200. For example, a person traveling in an automobile on $7^{th}$ Avenue between W $42^{nd}$ Street and W $43^{rd}$ Street may use a mobile device to query the sensor network 200 to find a coffee shop in the vicinity that has available tables. Sensors 205, 210, and 215 are located in or near coffee shops. In this example, the sensor 220, which is located in or near a sushi restaurant, is the closest sensor to the mobile device, thus the sensor 220 receives the query from the mobile device. The sensor 220 selects a random location, or a random sensor, in the sensor network 200 to which to route a packet corresponding to the query. The packet is routed toward the randomly selected location or sensor and to the sensors 205, 210, and 215 after the packet has been routed toward the randomly selected sensor.

Other types of sensors are included in the sensor network 200. A sensor 225 is located in or near a pizza restaurant. In response to a query from a sensor query device, the sensor 225 may provide, for example, an estimated wait time for a table in the restaurant. In this example, the sensor 225 may include one or more of a motion sensor, an infrared sensor, and an imaging sensor. The sensor 225 may estimate the wait time for a table in the pizza restaurant by sensing and characterizing the line of customers waiting for a table. For example, the sensor 225 may collect video data from the imaging sensor that may be analyzed to determine the length of the line and how quickly it is moving. The wait time for a table may be approximated from this data.

Sensors 230 and 235 are located in or near a deli and a coffee shop, respectively. The sensors may provide information similar to that provided by sensor 225 but specific to the deli and the coffee shop. For example, the sensor 235 may indicate the types of coffee that are available at from the coffee shop and whether there are any available tables within the coffee shop. The sensor network 200 also includes a sensor 240, which is located at a gas station. The sensor 240 may be configured to provide gasoline prices in response to queries from mobile devices roaming in the area of the sensor network 200.

Figure 3:
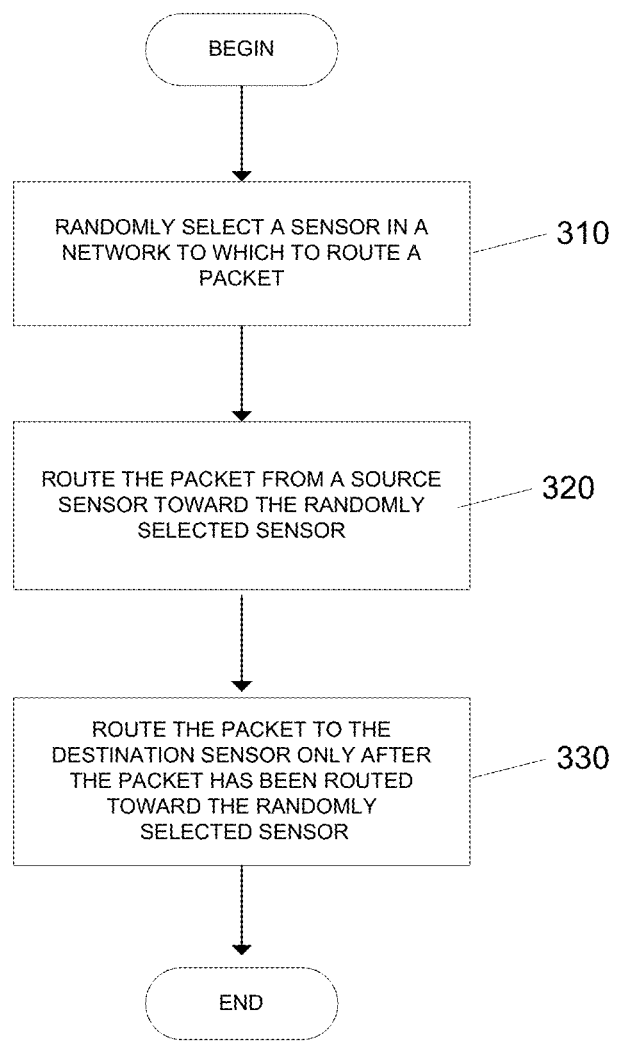
FIGS. 3-6, 9 and 12 are flow diagrams of example processes used to route a packet through a sensor network.

Referring to FIG. 3, an example process 300 routes a packet through a network from a source sensor to a destination sensor. The network may be a sensor network such as sensor networks 120 or 124 described above with respect to FIG. 1A. The source sensor may be a sensor such as the sensor 115S, and the destination sensor may be a sensor such as the sensor 115FF, both of which are described above with respect to FIG. 1A. The process 300 may be performed by a sensor that has received a packet to be routed in the sensor network.

The process 300 begins when a sensor in the network to which to route the packet is randomly selected (310). The sensor is randomly selected before the packet is routed to the destination sensor. Randomly selecting the sensor to which to route the packet may help to balance the traffic in the network. For example, by selecting the sensor to which to route the packet randomly, different available routing paths are used as time progresses. Thus, traffic across the network generally passes through all, or almost all, of the sensors in the network rather than only through the sensors that lie in a particular path. As a result, the power sources of the sensors in the network tend to be depleted relatively uniformly, which may lead to an increase in overall network lifetime. In some implementations, the source sensor performs the random selection of the sensor to which to route the packet. In this implementation, a processor on the source sensor may perform the random selection. Routing the packet can be performed using, for example, an underlying routing process in the network. For example, the packet may be routed using a point-to-point routing protocol used by the network. In this example, the packet may be routed greedily. The packet is routed greedily by sending it from a first sensor to a second sensor in the vicinity of the first sensor. Additionally, routing the packet may include routing based on physical coordinates of the sensors or based on logical coordinates of the sensors.

The process 300 continues when the packet is routed from the source sensor toward the randomly selected sensor (320). In one implementation, the packet is routed without enumeration of a path from the source sensor to the randomly selected sensor. Rather, the path that the packet follows from the source sensor to the randomly selected sensor is determined dynamically as the packet is routed toward the randomly selected sensor. The process 300 continues when the packet is routed to the destination sensor only after the packet has been routed toward the randomly selected sensor (330). In some implementations, the randomly selected sensor routes the packet toward the destination sensor. In other implementations, a sensor located near the randomly selected sensor routes the packet toward the destination sensor.

Figure 4:
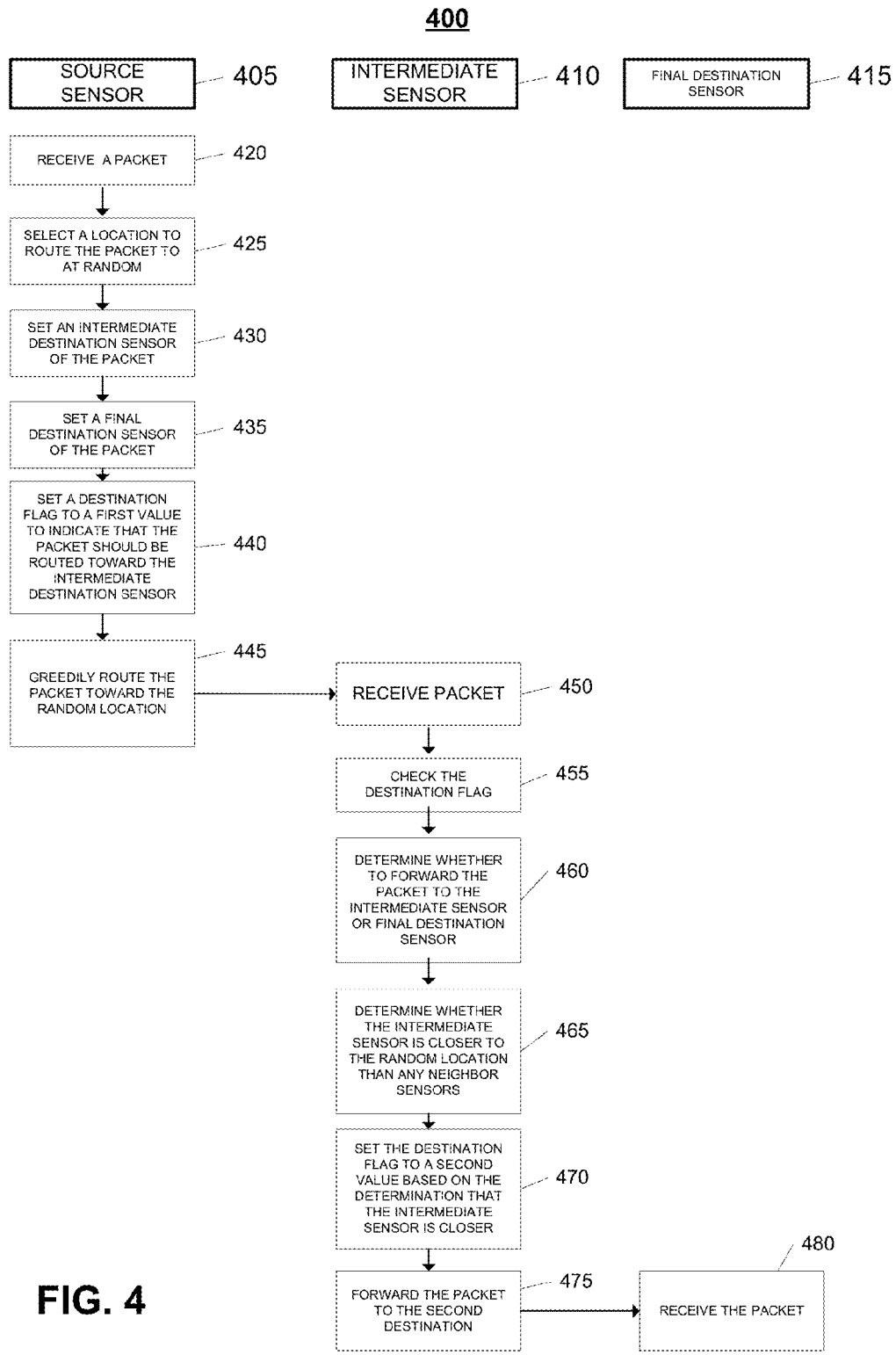

Referring to FIG. 4, a process 400 illustrates an example of a source sensor 405 routing a packet through an intermediate sensor 410 to a final destination sensor 415. The source sensor 405 may be a sensor such as the sensor 115S described with respect to FIG. 1, the intermediate sensor 410 may be a sensor such as the sensor 115N shown in FIG. 1, and the final destination sensor 415 may be a sensor such as the sensor 115FF shown in FIG. 1.

The source sensor 405 receives a packet (420) that is to be routed through the sensor network to the final destination sensor 415. The packet may include a query, or a portion of a query, from a sensor query device requesting information from a sensor in the sensor network. The sensor query device that issued the query or source sensor 405 may select a random location within the sensor network to which to route the packet (425). The randomly selected location may be expressed in terms of physical or logical coordinates of a sensor, a node, or a location near a sensor. As discussed above, the coordinates may be relative or absolute coordinates. In general, the sensors in the network are capable of approximating the physical or logical boundaries of the network. Thus, the randomly selected location is a location within the boundaries of the network (e.g., within the service area of the network). As discussed above with respect to FIG. 3, random selection of the location to which to route the packet may result in improved load balancing of the traffic across the sensor network.

The source sensor 405 sets an intermediate destination sensor of the packet (430) and a final destination sensor of the packet (435). The intermediate destination sensor of the packet may be a sensor near the randomly selected location. Alternatively, the intermediate destination sensor may be a randomly selected sensor. The source sensor 405 also sets a destination flag to a first value indicating that the packet should be routed towards the intermediate destination sensor (440). For example, the first value may be set to zero to indicate that the packet should be routed towards the intermediate destination sensor. The packet is greedily routed toward the intermediate destination sensor (445). For example, by routing the packet using the underlying routing protocol used by the sensor network (for example, a point-to-point routing protocol that forwards the packet from one sensor to another local sensor), the packet is routed greedily from the source sensor 405 towards the intermediate destination sensor.

The intermediate sensor 410 receives the packet from the source sensor 405 (450). The destination flag set in (440) is checked to determine the value of the destination flag. The value of the destination flag is used to determine whether to forward the packet toward the intermediate destination sensor of the packet or to the final destination sensor 415 of the packet (460). For example, if the value of the destination flag is zero, the packet is not forwarded to the final destination sensor 415. The intermediate sensor 410 determines whether it is closer to the intermediate destination sensor of the packet than any of it neighbor sensors (465). If the intermediate sensor 410 is not closer to the intermediate destination sensor, the destination flag of the packet remains set to the value indicating that the packet is to be forwarded to the intermediate destination sensor. In this case, the intermediate sensor 410 forwards the packet toward the intermediate destination sensor by forwarding the packet to another local intermediate sensor. When the other intermediate sensor receives the packet, it will check the value of the destination flag and determine whether it is closer to the intermediate destination sensor than its neighbor sensors. In contrast, if the intermediate sensor 410 is closer to the intermediate destination sensor of the packet, then the destination flag of the packet is set to a value indicating that it is to be forwarded to the final destination sensor 415 (470). For example, the destination flag may be changed from zero to one to indicate that the packet is to be forwarded to the final destination sensor 415. The example shown in FIG. 4 ends when the packet reaches its final destination sensor 415 (480).

Figure 5:
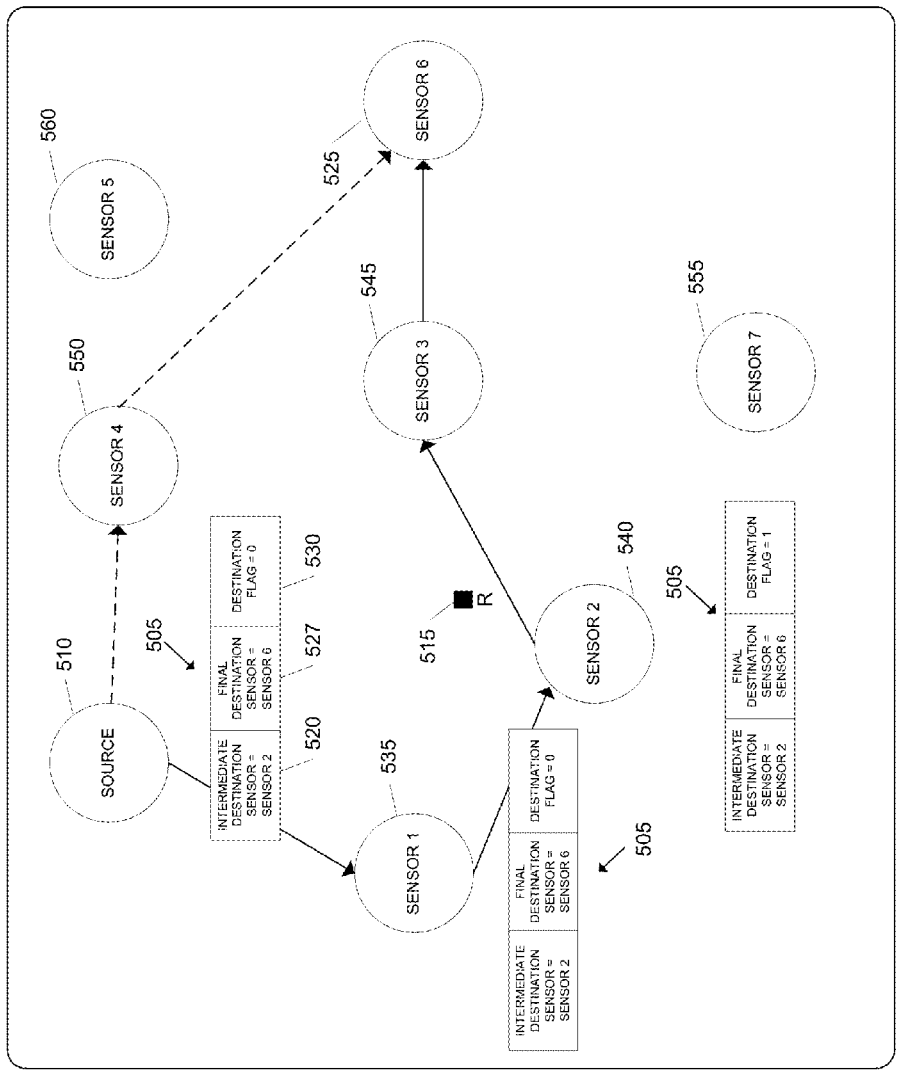

Referring to FIG. 5, an example sensor network 500 is illustrated in which a packet 505 is routed from a source sensor 510 towards a destination sensor 525. In particular, the source sensor 510 selects a random location R 515 within the sensor network 500 and routes the packet 505 greedily to a sensor near the random location R 515. As shown, the random location R 515 is a location near a sensor. The source sensor 510 sets an intermediate destination sensor 520 of the packet 505 to a sensor near the random location R 515. Alternatively, the random location R 515 may be a randomly selected sensor. In the example shown, the intermediate destination sensor 520 is set to "sensor 2" to indicate that "sensor 2" is a sensor close to the randomly selected location R 515. The source sensor 510 also sets a final destination sensor 527 of the packet 505. In this example, the final destination sensor 527 is set to "sensor 6" to indicate that "sensor 6" 525 is the final destination sensor of the packet 505. The source sensor 510 also sets a destination flag 530 to a value that indicates that the source sensor 510 routes the packet 505 towards the intermediate destination sensor 520 rather than the final destination sensor 530. The destination flag 530 is set to zero to indicate that the source sensor 510 routes the packet 505 towards the intermediate destination sensor 520.

Based on the value of the destination flag 530, the source sensor 510 routes the packet 505 toward the intermediate destination sensor 520. The packet 505 may be routed through one or more intermediate sensors in the sensor network 500 as it is routed to the intermediate destination sensor 520. As shown by the path indicated by the solid line, the packet is routed through intermediate sensors "sensor 1" 535 and "sensor 2" 540. At each intermediate sensor, the intermediate sensor checks the destination flag 530 of the packet 505 to determine whether to forward the packet 505 to the intermediate destination sensor 520 or the final destination sensor 527. The intermediate sensor determines whether it is closer to the intermediate destination sensor 520 than any of its neighbor sensors. If the intermediate sensor is closer than its neighbors to the intermediate destination sensor 520, the value of the destination flag 530 is set to indicate that the packet 505 is routed to the final destination sensor 530.

For example, the intermediate sensor "sensor 1" 535 receives the packet 505 from the source sensor 510. The intermediate sensor "sensor 1" 535 checks the destination flag 530 to determine whether to forward the packet 505 toward the intermediate destination sensor 520 or the final destination sensor 527. The intermediate sensor "sensor 1" 535 also determines whether it is closer to the intermediate destination sensor 520 than any of its neighbors. In the example shown, the neighbors of the intermediate destination sensor "sensor 1" 535 are the source sensor 510, and the sensors "sensor 2" 540, "sensor 3" 545, and "sensor 4" 550. Thus, compared to its neighbors, the intermediate sensor "sensor 1" 535 is not closer to the intermediate destination sensor 520 (which is set to "sensor 2" 540 in this example). As a result, the destination flag 530 remains unchanged and the intermediate sensor "sensor 1" 535 forwards the packet 505 towards the intermediate sensor destination 527.

When the intermediate sensor "sensor 2" 540 receives the packet 505, it also checks the value of the destination flag 530 to determine whether to forward the packet 505 to the intermediate destination sensor 520 or the final destination sensor 527. The intermediate sensor "sensor 2" 540 then determines whether it is closer to the intermediate destination sensor 520 than its neighbors. In the example shown, the intermediate sensor "sensor 2" is the intermediate destination sensor 520, thus the destination flag 530 is changed to a value indicating that the packet 505 is to be forwarded to the final destination sensor 527 (which is "sensor 6" 525 in this example). For example, and as shown in the illustration in FIG. 5, the value of the destination flag is changed from "0" to "1" such that the packet 505 is forwarded to the final destination sensor 527. The intermediate sensor "sensor 2" 540 then forwards the packet 505 to the final destination sensor 527, which is the "sensor 6" 525 in the example shown in FIG. 5. In the example shown, the packet 505 is routed to "sensor 3" 545 and then to the "sensor 6" 525. In other examples, the packet 505 may pass through more or fewer sensors before reaching the final destination sensor.

Thus, the packet 505 is routed from the source sensor 510 to the final destination sensor "sensor 6" 525 as shown by the solid line path. The dashed line path shows the shortest route from the source sensor 510 to the final destination sensor "sensor 6" 525. The path of the packet 505 is not predetermined, enumerated or otherwise predefined before the routing is initiated. Thus, the packet 505 follows a path through the sensor network based on the selection of the random location rather than on a predefined path or a predefined criteria (such as the shortest path from the source sensor to the final destination sensor).

Figure 6:
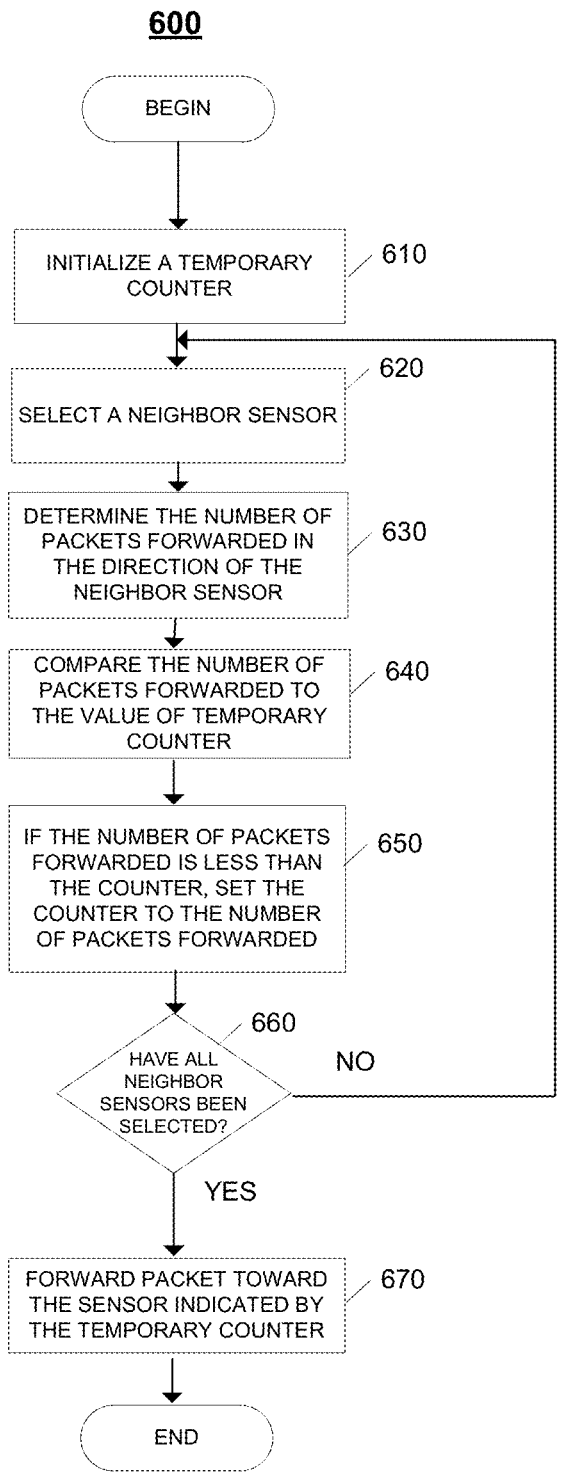

Referring to FIG. 6, an example process 600 selects a sensor to which a packet is to be routed. The process 600 may be an example of a routing a packet between adjacent sensors during a process to route the packet from a source sensor to a destination sensor. In a more particular example using the sensor network 120 of FIG. 1A as an example, the process of routing a packet from a source sensor 115S to the destination sensor 115FF may involve routing the packet between many other sensors, such as 115T, 115U and 115V. Moreover, the process 600 may be used as a part of a process that routes a packet through a randomly selected sensor before routing the packet to a final destination sensor, such as described previously with respect to FIGS. 3-5. The process 600 may be performed by a sensor in a sensor network in response to the sensor's receipt of a packet.

The process 600 begins when a temporary counter is initialized (610). The temporary counter may be initialized to a relatively high value, such as a value that is likely to be higher than number of packets that the sensor forwarded to any of its neighbor sensors. In some implementations, the temporary counter may be initialized to infinity. As explained below, the counter is used to determine a sensor to which to forward the packet. In general, the packet is forwarded to a neighbor sensor to which the fewest packets have been routed. The sensor selects a neighbor sensor (620). In some implementations, such as in a mesh network, the sensor selects a sensor that is adjacent to itself. In other implementations, any sensor in the sensor network with which the sensor may communicate is a neighbor sensor. The sensor determines the number of packets routed in the direction of the selected neighbor sensor (630). As discussed more fully with respect to FIGS. 7 and 8, the sensor keeps track of the number of packets the sensor has forwarded to other sensors in the sensor network. Thus, the sensor determines the number of packets routed in the direction of the neighbor sensor without communicating with the neighbor sensor or other sensors in the sensor network.

The number of packets routed in the direction of the selected neighbor sensor is an approximation for the number of packets that have passed through all of the paths on which the selected neighbor sensor falls. The number of packets routed in the direction of the selected neighbor sensor is also an approximation of the number of packets routed to the sensors that are in the portion of the sensor network behind the selected neighbor sensor. Thus, determining the number of packets routed in the direction of each of the neighbor sensors provides an approximation of the number of packets forwarded to each sensor in the sensor network without having to communicate with each sensor in the sensor network. Additionally, the number of packets routed in the direction of the selected sensor may be an indication of the energy status of the selected sensor. If a relatively large number of packets has been forwarded in the direction of the selected sensor, it may be an indication that traffic across the network would be more balanced if the packet was routed in another direction.

The distribution also may take into account the configuration of sensors behind a given neighbor. For example, the number of sensors behind a neighbor may be considered in determining how to route the packets. For example, one sensor may have two neighbors, A and B. A has 8 neighbors, and B has two neighbors. The process 600 may account for A having more neighbors than B by routing more packets to A than B. The sensor then compares the number of packets forwarded to the selected neighbor sensor to the value of the temporary counter (640). As discussed above, the sensor tracks the number of packets forwarded to its neighbors. If the number of packets forwarded to the selected neighbor is less than the value of the temporary counter, the value of the temporary counter is set to the number of packets forwarded to the neighboring sensor (650). In some implementations, the value of the temporary counter is set to the number of packets forwarded to the neighboring sensor if the number of packets forwarded is less than or equal to the value of the temporary counter. Additionally, if the number of packets forwarded to the neighboring sensor is less than the value of the temporary counter, the temporary counter or the sensor stores an identifier of the selected neighbor sensor. If the number of packets routed is not less than the value of the temporary counter, then the counter is not set to the number of packets forwarded to the selected neighbor sensor.

The sensor then determines whether all of the neighbor sensors have been selected (660). If all of the neighbor sensors have not been selected, the process 600 returns to (620) and selects another neighbor sensor. Thus, the process 600 continues until the sensor has selected all neighbor sensors. This results in the temporary counter indicating the neighbor sensor to which the fewest packets have been routed unless the initial value of the temporary sensor was a value that was lower than the number of packets forwarded to any neighbor sensor. In this case, the sensor may randomly select a neighbor sensor to which to forward the packet.

If all of the neighbor sensors have been selected, the packet is forwarded to the neighbor sensor indicated by the temporary counter (670). As discussed above, the temporary counter indicates which neighbor sensor has received the fewest packets from the sensor. Thus, the sensor forwards the packet to the neighbor sensor to which it has routed the fewest packets.

The process 600 may be used in conjunction with routing a packet to a randomly selected sensor before routing the packet to the final destination sensor, which also helps to balance traffic across the sensor network. In some cases, network traffic may be more efficiently balanced through the use of the combined techniques.

Figure 7:
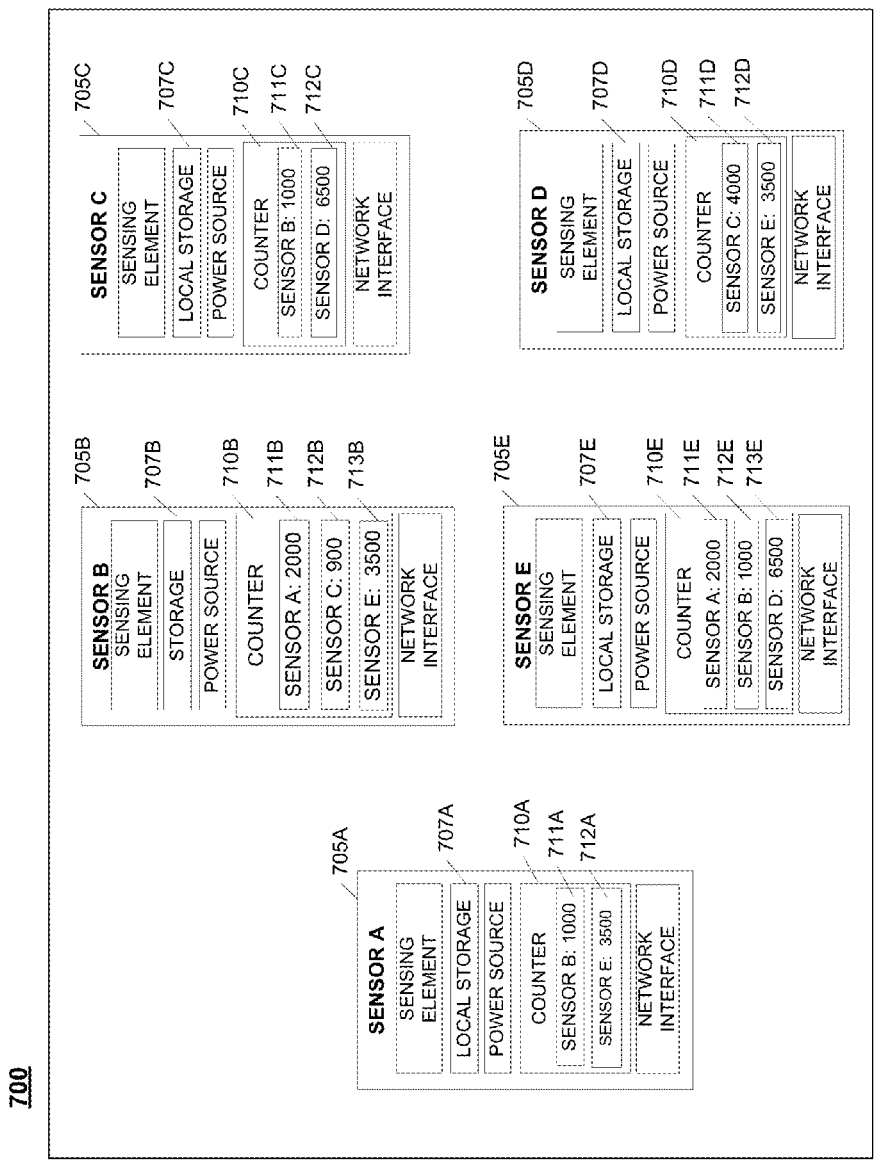

Referring to FIG. 7, an example sensor network 700 includes sensors 705A-705E. The sensors 705A-705E may be similar to the sensors described above with respect to FIGS. 1A and 1B. Each of the sensors 705A-705E includes corresponding counters 710A-710E that indicates the number of packets forwarded by each sensor to neighboring sensors. The number of packets forwarded by each sensor may be the number of packets forwarded within a predetermined time period. The predetermined time period may be measured temporally (for example, hours or days) or from an event (for example, the predetermined time period may be measured since the installation or recharging of the sensor's power source). The information in the counters 710A-710E may be used to route a packet from one of the sensors 705A-705E to a neighbor to which relatively few packets have been routed. As shown, the counters 710A-710E use storage that is separate from the local storage 707A-707E included in each of the sensors 705A-705E. However, in some implementations, the information stored in the counters 710A-710E may be stored on the local storage.

More particularly, in the example sensor network 700, the sensor 705A has two neighbors: sensor 705B and sensor 705E. Thus, the counter 710A on the sensor 705A indicates how many packets the sensor 705A has forwarded to the sensors 705B (illustrated by sub-counter 711A) and 705E (illustrated by sub-counter 712A). In this example, the counter 710A shows that the sensor 705A has forwarded 1000 packets to the sensor 705B (illustrated by sub-counter 711A) and 3500 packets to the sensor 705E (illustrated by sub-counter 712A). The counters 710B-710E included on the other sensors 705B-705E in the sensor network show similar information. For example, the counter 710B shows that the sensor 705B has routed 2000 packets to the sensor 705A (illustrated by sub-counter 711B), 900 packets to the sensor 705C (illustrated by sub-counter 712B), and 3500 packets to the sensor 705E (illustrated by sub-counter 713B). The counters 710A-710E in the example shown in FIG. 7 indicate the number of packets routed from a sensor to one of its adjacent neighbors, and this information also indicates how many packets a sensor has routed in the direction of each of its adjacent neighbors. Moreover, in other implementations, a neighboring sensor may be adjacent sensors as well as non-adjacent sensors with which another sensor is in communication. In other implementations, neighbor sensors may be other sensors that are physically or logically near the sensor.

Figure 8:
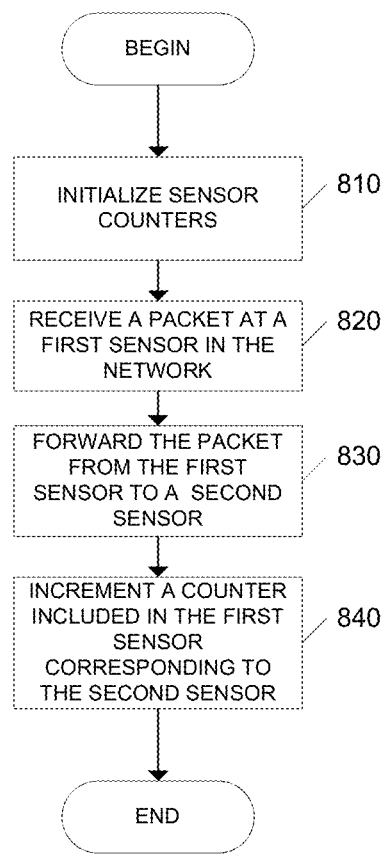
FIG. 8 is a flow diagram of an example process for using sensor counters for a sensor network in a routing process.

Referring to FIG. 8, an example process 800 is illustrated for using sensor counter in a sensor network in a routing process. For example, the process 800 may be used to initialize and use the counters 710A-710E on the sensors 705A-705E in the sensor network 700 shown in FIG. 7. As described above, the counters 710A-710E include information about the number of packets that a sensor has forwarded to its neighbors. The process 800 may be used after the occurrence of a particular event, for example, when the sensor network 700 is first deployed or when one or more power sources in the sensors in the sensor network 700 are replaced or recharged. Alternatively or additionally, the process 800 may be used to reset one or more counters in the sensor network after a predetermined time period has elapsed. This allows the counters to indicate the number of packets a sensor has forwarded to each of its neighbors during the time period.

The process 800 begins when the counters included on the sensors in the network are initialized (810). For example, the counters may be initialized by setting the counters to a value of zero to indicate that the sensor has not forwarded any packets to any of its neighbor sensors. The process 800 continues when a packet is received at a first sensor in the network (820). The first sensor may be any sensor in the sensor network. For example, the packet may be received by the sensor 705A shown in FIG. 7. The process 800 continues when the first sensor forwards the packet to a second sensor in the sensor network (830). Forwarding the packet to a second sensor may include forwarding the sensor in the direction of the second sensor. For example, the second sensor may be a destination sensor of the packet, or it may be an intermediate destination of the packet. The process 800 continues when a counter on the first sensor and corresponding to the second sensor is incremented (840). The counter on the first sensor includes data values for each neighbor sensor of the first sensor, and the data value corresponding to the second sensor is incremented in response to forwarding the packet to the second sensor. For example, and referring briefly to FIG. 7, if the sensor 705A forwards a packet to the sensor 705B, the "SENSOR B" data value of the counter 710A increases from 1000 to 1001. The process 800 continues to increment the counters on each sensor in the network until the counters are initialized again.

Figure 9:
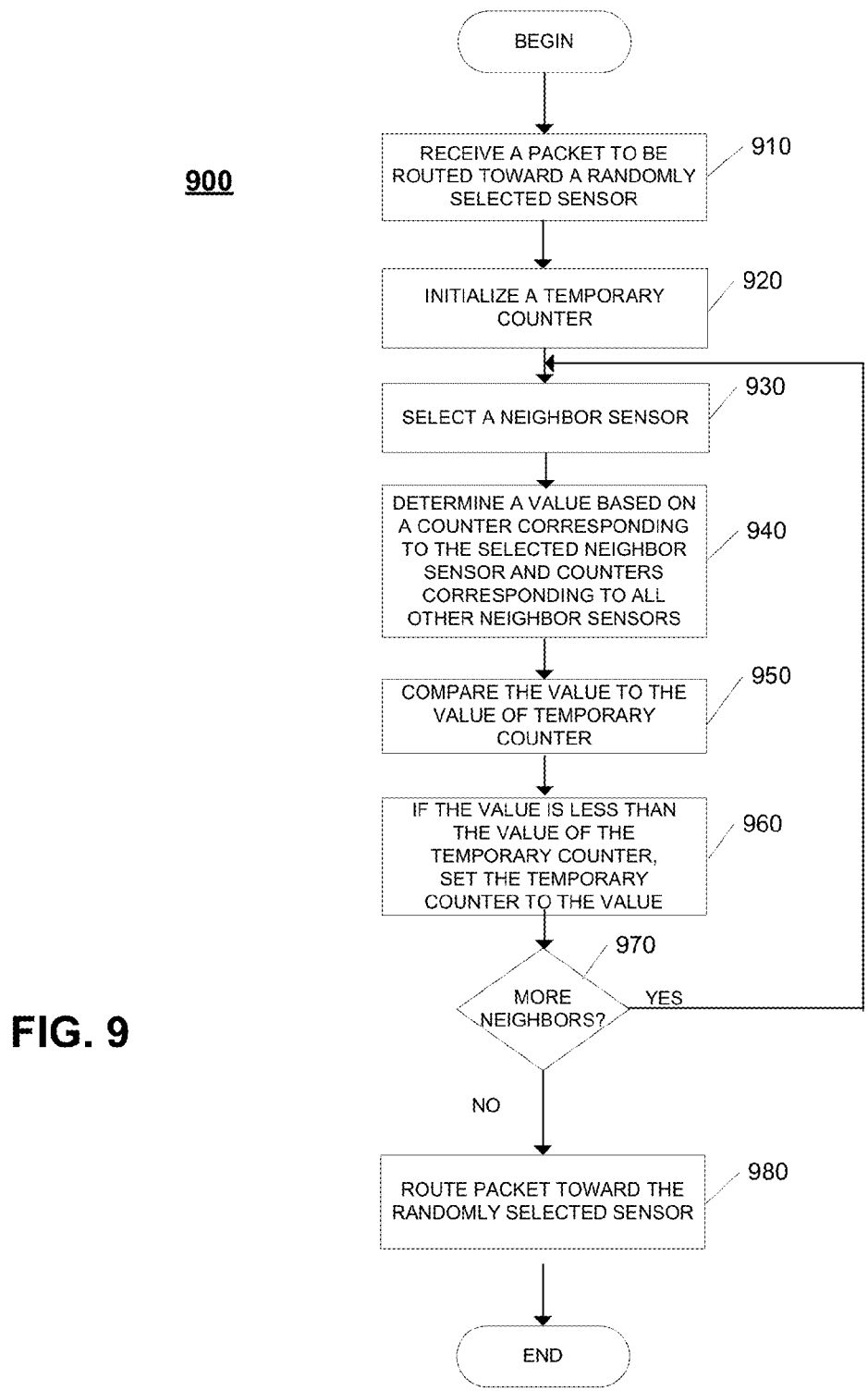

Referring to FIG. 9, an example process 900 determines through which neighbor sensor to route a packet in a direction toward a randomly selected sensor based on a ratio of the counter representing the number of packets routed in the direction of the neighbor sensor to a value representing the number of packets routed in other directions from the sensor. The number of packets forwarded to each neighbor sensor may be an approximation of the number of packets that each of the neighbor sensors have processed. The example process 900 may be used, for example, to determine a relatively unloaded neighboring sensor (e.g., a neighboring sensor or a direction through which relatively few packets have been forwarded) to which to forward a packet.

The process 900 begins when a packet to be routed to a randomly selected sensor is received (910). The packet may be received at any sensor in a sensor network such as the sensor network 700 described above with respect to FIG. 7. For example, the packet may be the packet 720 and it may be received at the sensor 705A. The process 900 continues when a temporary counter is initialized (920). The temporary counter may be initialized to a value that is likely to be higher than the number of packets forwarded by the sensor to any of its neighbors. The process continues when the sensor selects a neighbor sensor to which to forward the packet (930). The neighbor sensor may be a sensor adjacent to the sensor or it may be any sensor in the sensor network with which the sensor communicates. The process 900 continues when a value based on a counter corresponding to the selected neighbor sensor, or the direction of the selected neighbor sensor, and one or more counters corresponding to the other neighbors of the sensor 705A is determined (940). For example, and referring again to FIG. 7, if the selected neighbor sensor is the sensor 705B, the value of the counter 710A corresponding to the direction or the randomly selected sensor is 1000. The value of the neighbors of the sensor 705A are 1000 for the sensor 705B and 3500 for the sensor 705E. The value determined may be a ratio of the value of the counter 710A in the direction of the randomly selected sensor and the sum of the values of the counters corresponding to the directions of all of the sensor's neighbors. Continuing this example, the value is 1000/4500, or 0.222. The value may be determined based upon other approaches. For example, the value may be determined by the ratio of the value of the counter in the direction of the randomly selected sensor to the value of the counter corresponding to one other direction, or another neighboring sensor, rather than the sum of all neighboring sensors or directions.

The process 900 continues when the value determined in (940) is compared to a value of the temporary counter (950). If the determined value does not exceed the value of the temporary counter, the temporary counter is set to the determined value (960). The sensor that received the packet determines whether there are any other neighbor sensors (970). If there are other neighbor sensors, the process 900 returns to 920 and another neighbor sensor is selected. The process 900 continues until all neighbor sensors have been selected. Thus, the process 900 results in selecting a neighboring sensor or direction to which the fewest packets have been forwarded. If all of the neighbor sensors exceed the initial value of the temporary counter, the sensor may forward the packet to the neighbor sensor selected at random.

Figure 10:
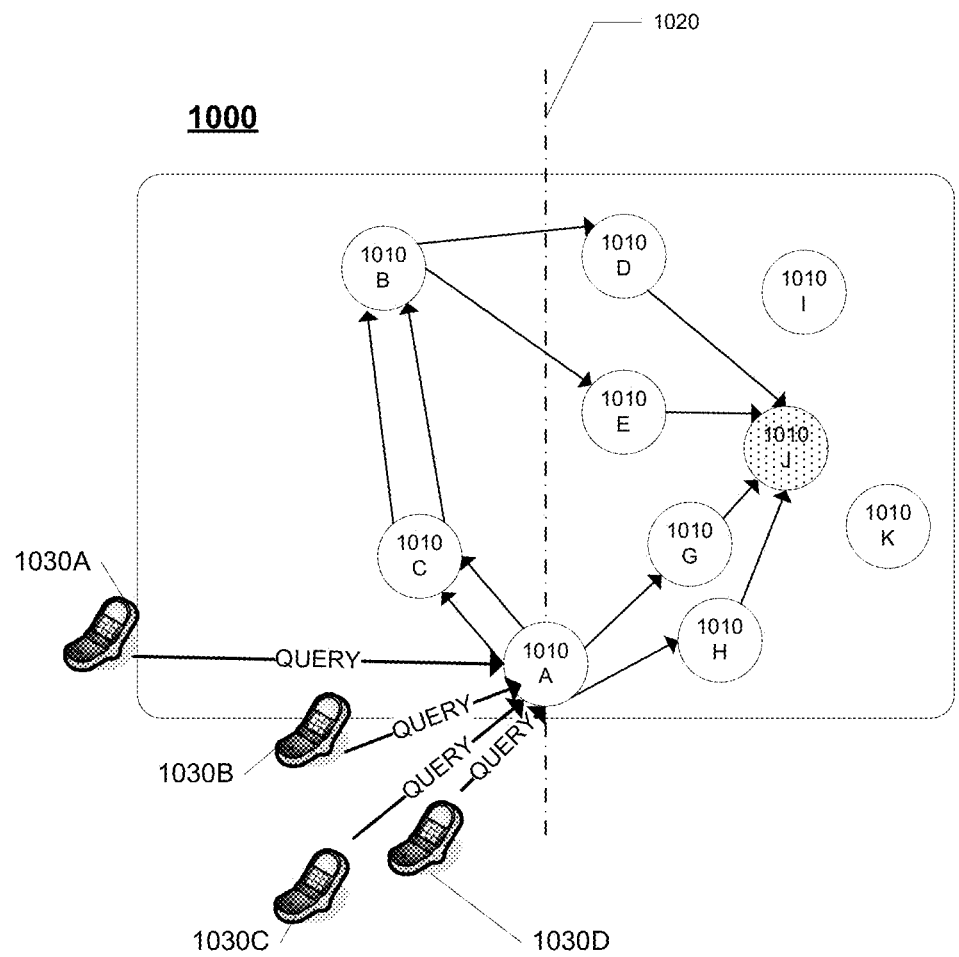

Referring to FIG. 10, the example process 900 may be used in a sensor network 1000 that includes sensors 1010A-1010J arranged irregularly. For example, the sensor network 1000 has sensors 1010A-1010J arranged in what may be referred to as a "skewed deployment." In particular, the sensors in the sensor network 1000 have a non-uniform spatial distribution with respect to a center line 1020. The portion of the sensor network 1000 to the right of the center line 1020 includes more sensors than the portion of the sensor network 1000 to the left of the center line 1020. If a sensor 1010J on the more dense right side of the network is queried often for information by sensor query devices 1030A-1030D through a source sensor 1010A, the sensors on the left side of the sensor 1010A may be more loaded than the sensors on the right side of the sensor 1010A. The higher loading on the left side of the network 1000 may occur because of the relative scarcity of sensors through which to route the packet as it is routed toward a randomly selected sensor and to the destination sensor 1010J. By using a process such as the process 900, the loading of the left-side neighbor sensor 1010C and the loading of the neighbor sensors 1010G and 1010H may become more uniform, which may further improve the balancing of traffic across the sensor network 1000 even in the presence of a skewed sensor deployment. In particular, a process such as the process 900 tends to route packets towards sensors through which fewer queries have been routed (such sensors also may be considered to be the sensors with the lightest loads). Thus, such a process may tend to select the sensors 1010G and 1010H and reduce the load on the sensor 1010C.

Figure 11:
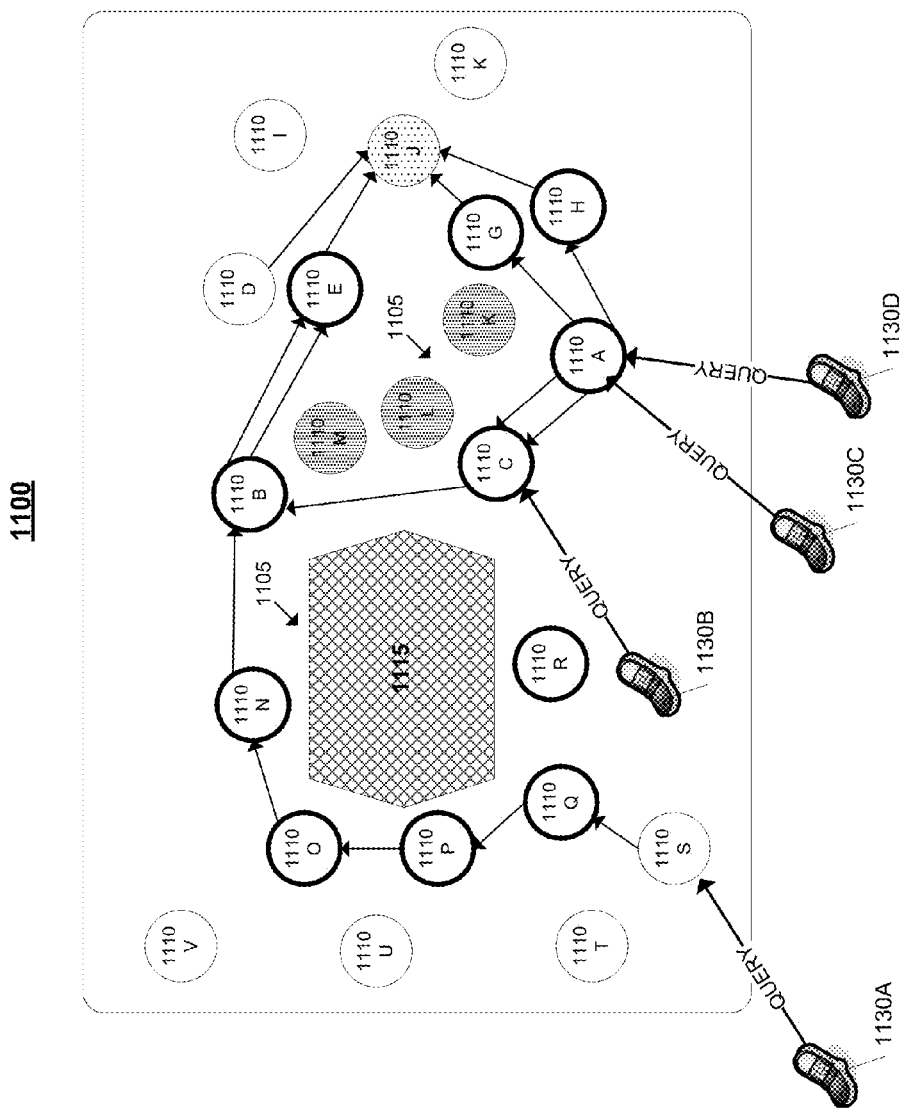

Referring to FIG. 11, a sensor network may include one or more geographic areas in which no sensors are deployed. Such a geographic area may be referred to as a gap. The example sensor network 1100 includes a gap 1105 in which no sensors are deployed. The gap may be caused by, for example, the inoperability or diminished capacity of the sensors (such as sensors 1110K, 1110L, and 1110M) in the geographic area and/or a physical obstruction (such as an obstruction 1115) within the sensor network that prevents the deployment of sensors in the area around the physical obstruction. A gap caused by a group of inoperable sensors may include a small portion of operable sensors that are inaccessible to the sensor network because of the presence of a larger group of inoperable sensors. The physical obstruction may be a natural obstruction, such as a river, lake, mountain, or forest, or it may be a manmade obstruction, such as a building. In the example sensor network 1100, the sensors 1110B, 1110C, and 1110N-R border a gap created by the physical obstruction 1115. The sensors 1110A-C, 1110E, 1110G, and 1110J border a gap created by the inoperability or diminished capacity of the sensors 1110K-M.

Similar to the sensor networks discussed above, the sensors in the sensor network 1100 receive queries from sensor query devices 1130A-1130D requesting data stored on the sensors in the sensor network 1100. As shown in FIG. 11, the sensor 1110J stores information of interest to multiple users and is queried by the sensor query devices 1130A-1130D. Either the sensor query device that issued the query or the sensor that receives the query randomly selects a sensor in the network to which to route the packet, and the packet is routed through the sensor network toward the randomly selected sensor.

The sensors that fall on the border of the gaps tend to become more overloaded with packets resulting from the queries than sensors in other portions of the sensor network because of the relative scarcity of sensors in the vicinity of the gap. In other words, the sensors on the border of the gap region tend to receive and process more packets relative to the other sensors in the network, which may cause the traffic across the sensor network to be unbalanced. Thus, without corrective measures, the border sensors may experience reduced lifetime as compared to the other sensors in the sensor network 1110.

Figure 12:
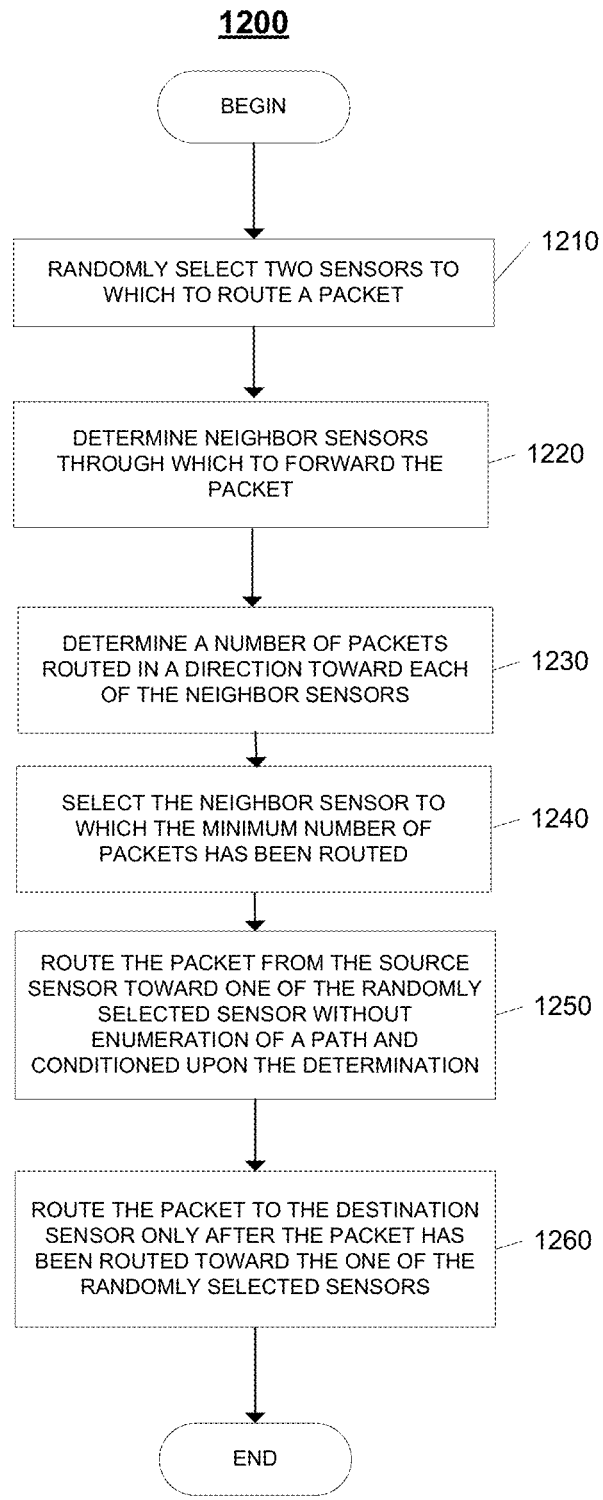

Referring to FIG. 12, an example process 1200 routes a packet from a source sensor to a destination sensor through a sensor network that includes one or more geographic locations where no sensors are deployed (e.g., gaps). As discussed above, groups of sensors that are inoperable or have diminished capacity and/or physical obstructions may cause the gaps. The presence of gaps in the sensor network may cause the sensors on the borders of the gaps to be more loaded than the other sensors in the sensor network. However, by selecting two or more sensors at random to which to route the packet before routing the packet to the destination sensor rather than one, the traffic across a network that includes one or more gaps may be more evenly balanced. In particular, selecting two or more sensors allows the packet to be routed in the direction toward the randomly selected sensor through which fewer packets have been routed. Thus, selection of two or more randomly selected sensors may help reduce the loading of sensors through which a high volume of packets travel, such as sensors that are on the border of gaps within the sensor network.

The process 1200 begins when two sensors to which to route the packet are selected at random (1210). The sensors may be selected at random by the source sensor (e.g., the sensor that receives a query), or the randomly selected sensors may be selected by a sensor query device that issued a query. The randomly selected sensors are within the sensor network. In some implementations, more than two sensors may be selected at random. Randomly selecting two sensors, or more than two sensors, improves the probability that the randomly selected sensor is not a sensor on the border of a gap. Alternatively or additionally to selecting sensors at random, locations within the network to route the packet toward may be randomly selected.

The process 1200 continues when the source sensor determines neighbor sensors to forward the packet toward each of the randomly selected sensors (1220). For example, if two sensors are randomly selected, the source sensor determines two neighbors, with one neighbor sensor involved in forwarding the packet to each of the two randomly selected sensors. The source sensor determines the number of packets that have been routed to each of the determined neighbor sensors (1230). The number of packets routed to each of the determined neighbor sensors may be indicated by a counter on the source sensor that tracks the number of packets the source sensor has forwarded to its neighbors, such as the counters 710A-710E described with respect to FIG. 7. Because each of the determined neighbor sensors are along a route to each of the randomly selected sensors, the number of packets forwarded to the determined neighbor sensors is an approximation of the number of packets routed toward each of the randomly selected sensors. In one implementation, the source sensor selects the neighbor sensor with the lowest counter value (1240). The packet is routed from the source sensor toward one of the randomly selected sensors (1250). In some implementations, the packet is routed without enumeration of a path from the source sensor to the one of the randomly selected sensors. Additionally, the routing can be conditioned upon a determination that the number of packets routed in the direction toward the one of the randomly selected sensors does not exceed the number of packets routed in the direction of the other of the randomly selected sensors. Thus, the packet is generally routed to the randomly selected sensor to which fewer packets have been routed. This may improve the balancing of traffic across the sensor network by not routing packets in the direction of a sensor to which a relatively large number of packets has been routed, such as a sensor on the border of a gap.

If the same number of packets have been routed toward the randomly selected sensors, the randomly selected sensor with a physical or logical location closest to the sensor routing the packet may be selected. Other approaches for determining which randomly selected sensor to route the packet toward in the event of a tie may be used. For example, the sensor may route the packet toward the randomly selected sensor other than the randomly selected sensor that it routed a packet toward more recently. In this implementation, the counter that tracks the routing of packets towards other sensors in the network also tracks the time at which these packets were routed. If the randomly selected sensors are in the same sub-net, then a third sensor may be selected at random. If the randomly selected sensors are in the same sub-net, there is an increased likelihood that similar numbers of packets have been routed towards these randomly selected sensors. By selecting a third sensor at random, which is probably, or can be stipulated to be, not in the same sub-net, the traffic across the network may be more balanced.

The process 1200 continues when the packet is routed to the destination sensor only after the packet has been routed toward the one of the randomly selected sensors (1240). The process 1200 ends when the destination sensor receives the packet.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A device comprising:
    at least one processor; and
    a storage device, the storage device storing instructions for causing the at least one processing device to:
        track numbers of packets forwarded from a sensing device to a plurality of neighbor sensors in a network of the sensing device;
        select two or more sensors from the plurality of neighbor sensors in the network to which to potentially route a packet, the two or more sensing devices being randomly selected and being intermediate sensing devices in the network between the sensing device and a destination sensor in the network;

determine, based on the tracked numbers of packets forwarded to the plurality of neighbor sensors, whether a number of packets routed in a direction toward one of the two or more selected sensors does not exceed a number of packets routed in a direction of another one of the two or more selected sensors; and route the packet from the sensing device toward one of the two or more selected sensors while not routing the packet from the sensing device toward another one of the two or more selected sensors, the routing being conditioned upon a determination that the number of packets routed in the direction toward the one of the two or more selected sensors does not exceed the number of packets routed in the direction of the another one of the two or more selected sensors such that two packets that arrive in sequence at the sensing device are not both routed on a shortest path to the destination sensor.

2. The sensing device of claim 1, wherein the numbers of packets routed in the direction of the two or more selected sensors are equal and the storage device stores instructions for causing the at least one processing device to:

determine to which of the two or more selected sensors a packet was least recently routed toward; and select a sensor least recently routed toward as the one of the two or more selected sensors.

3. The sensing device of claim 1, wherein the determining whether the number of packets routed in the direction toward the one of the two or more selected sensors comprises determining the number of packets routed in the direction toward a neighbor of the sensing device.

4. The sensing device of claim 1, wherein routing the packet comprises routing the packet using an underlying routing protocol of the network.

5. The sensing device of claim 4, wherein the underlying routing protocol of the network is a point-to-point routing protocol.

6. A method of routing packets in a wireless network, the method comprising:

identifying a packet for routing through a network of sensors from a source sensor to a destination sensor associated with the network;

at the source sensor, randomly selecting from all of the sensors in the network a plurality of intermediate sensors between the source sensor and the destination sensor in the network;

tracking a number of packets that have been routed to each of the randomly selected plurality of intermediate sensors;

determining a load associated with each of the randomly selected plurality of intermediate sensors based on the tracked number of packets; and routing the packet to a sensor selected from the randomly selected plurality of intermediate sensors that has the lightest load rather than directly to the destination sensor, wherein the selected sensor having the lightest load is the sensor selected from the randomly selected plurality of intermediate sensors to which the fewest packets have been routed such that two packets that arrive in sequence at the source sensor are not both routed on a shortest path to the destination sensor.

7. The method of claim 6, wherein when two sensors have the lightest load then the method further including determining to which of the two sensors a packet was least recently routed toward; and select a sensor least recently routed toward as the sensor for routing the packet.

8. The method of claim 6 further comprising determining whether the number of packets routed in the direction toward one of the randomly selected plurality of intermediate sensors comprises determining the number of packets routed in the direction toward a neighbor of a respective selected sensor.

9. The method of claim 6, wherein routing the packet comprises routing the packet using an underlying routing protocol of the network.

10. The method of claim 9, wherein the underlying routing protocol of the network is a point-to-point routing protocol.

11. A method of routing packets in a wireless network, the method comprising:

selecting a sensor in a network to which to route a packet from a source sensor in a path toward a destination sensor, wherein:

the sensor is selected randomly by the source sensor without communicating with the selected sensor or any neighbor sensors, and sensors in the network have a non-uniform spatial distribution;

tracking a number of packets that have been routed to the selected sensor and one or more neighbor sensors of the source sensor, the one or more neighbor sensors being selected randomly and being intermediate sensors between the source sensor and the destination sensor;

determining, based on the tracking, whether a number of packets routed in the direction toward the selected sensor does not exceed a number of packets routed in the direction of the one or more selected neighbor sensors of the source sensor; and routing the packet from the source sensor toward the selected sensor while not routing the packet from the source sensor to the one or more selected neighbor sensors, the routing being conditioned upon a determination that the number of packets routed in the direction toward the selected sensor does not exceed the number of packets routed in the direction of the one or more selected neighbor sensors such that two packets that arrive in sequence at the source sensor are not both routed on a shortest path to the destination sensor.

12. The method of claim 11, wherein the routing being conditioned upon a determination that the number of packets routed in the direction toward the selected sensor does not exceed the number of packets routed in the direction toward the one or more selected neighbor sensors comprises routing the packet conditioned upon a determination that the number of packets routed in the direction toward the selected sensor is less than the number of packets routed in the direction of each of the one or more selected neighbor sensors.

13. The method of claim 11, wherein the routing is conditioned upon a determination that the number of packets routed in the direction toward the selected sensor does not exceed the number of packets routed in the direction of the one or more selected neighbor sensors, and further comprising:

selecting a second sensor in the network to which to route the packet before the packet is routed to the destination sensor, the second sensor being selected randomly; and routing the packet from the source sensor toward the selected second sensor without enumeration of a path from the source sensor to the selected second sensor, the routing being conditioned upon a determination that a number of packets routed in the direction toward the selected second sensor is less than a number of packets routed toward one or more randomly selected neighbor sensors of the second sensor.

14. The method of claim 11, wherein tracking a number of packets comprises maintaining a counter on the source sensor in response to a packet being routed from the source sensor to the selected sensor, the method further comprising:
determining the number of packets routed to the selected sensor based on the counter.

15. The method of claim 11, wherein determining that the number of packets routed in the direction toward the selected sensor does not exceed the number of packets routed in the direction toward the one or more selected neighbor sensors is determined based on a comparison, to a threshold value, of a ratio of a counter representing a direction of the selected sensor and a sum of counters representing directions of the one or more selected neighbor sensors and further comprising forwarding the packet in a direction other than the direction toward the selected sensor when the threshold value is exceeded.

16. A computer program product comprising instructions stored in a non-transitory memory that when executed by a processor, cause the processor to:
track numbers of packets forwarded from a first sensing device to a plurality of neighbor sensors in a network of the first sensing device;
select two or more sensors from the plurality of neighbor sensors in the network to which to potentially route a packet, the two or more sensing devices being randomly selected and being intermediate sensing devices in the network between the first sensing device and a destination sensor for the packet in the network;
determine, based on the tracked numbers of packets forwarded to the plurality of neighbor sensors, whether a number of packets routed in a direction toward one of the two or more selected sensors does not exceed a number of packets routed in a direction of another one of the two or more selected sensors; and
route the packet from the first sensing device toward one of the two or more selected sensors while not routing the packet from the first sensing device toward another one of the two or more selected sensors, the routing being conditioned upon a determination that the number of packets routed in the direction toward the one of the two or more selected sensors does not exceed the number of packets routed in the direction of the another one of the two or more selected sensors such that two packets that arrive in sequence at the first sensing device are not both routed on a shortest path to the destination sensor.

17. A computer program product comprising instructions stored in a non-transitory memory that when executed by a processor, cause the processor to:
identify a packet for routing through a network of sensors from a source sensor to a destination sensor associated with the network;
at the source sensor, randomly select from all of the sensors in the network a plurality of intermediate sensors between the source sensor and the destination sensor in the network;
track a number of packets that have been routed to each of the randomly selected plurality of intermediate sensors;
determine a load associated with each of the randomly selected plurality of intermediate sensors based on the tracked number of packets; and
route the packet to a sensor selected from the randomly selected plurality of intermediate sensors that has the lightest load rather than directly to the destination sensor, wherein the selected sensor having the lightest load is the sensor selected from the randomly selected plurality of intermediate sensors to which the fewest packets have been routed such that two packets that arrive in sequence at the source sensor are not both routed on a shortest path to the destination sensor.

18. A computer program product comprising instructions stored in a non-transitory memory that when executed by a processor, cause the processor to:
select a sensor in a network to which to route a packet from a source sensor in a path toward a destination sensor, wherein:
the sensor is selected randomly by the source sensor without communicating with the selected sensor or any neighbor sensors, and
sensors in the network have a non-uniform spatial distribution;
track a number of packets that have been routed to the selected sensor and one or more neighbor sensors of the source sensor, the one or more neighbor sensors being selected randomly and being intermediate sensors between the source sensor and the destination sensor;
determine, based on the tracking, whether a number of packets routed in the direction toward the selected sensor does not exceed a number of packets routed in the direction of the one or more selected neighbor sensors of the source sensor; and
route the packet from the source sensor toward the selected sensor while not routing the packet from the source sensor to the one or more selected neighbor sensors, the routing being conditioned upon a determination that the number of packets routed in the direction toward the selected sensor does not exceed the number of packets routed in the direction of the one or more selected neighbor sensors such that two packets that arrive in sequence at the source sensor are not both routed on a shortest path to the destination sensor.

* * * * *